United States Patent [19]

Meyers

[11] 4,011,452
[45] Mar. 8, 1977

[54] ANTINARCISSUS REFLECTOR ASSEMBLY FOR INFRARED DETECTOR

[75] Inventor: Franklin J. Meyers, Canoga Park, Calif.

[73] Assignee: The United States of America as represented by the Secretary of the Air Force, Washington, D.C.

[22] Filed: Nov. 6, 1975

[21] Appl. No.: 629,467

[52] U.S. Cl. .............................................. 250/352
[51] Int. Cl.² .......................................... G01J 1/04
[58] Field of Search .................. 250/347, 352, 353

[56] References Cited

UNITED STATES PATENTS

| | | | |
|---|---|---|---|
| 3,227,877 | 1/1966 | Dreyfus | 250/352 |
| 3,732,421 | 5/1973 | Kunimoto et al. | 250/352 |
| 3,899,674 | 8/1975 | DeCramer et al. | 250/352 |

*Primary Examiner*—Archie R. Borchelt
*Attorney, Agent, or Firm*—Joseph E. Rusz; Arsen Tashjian

[57] ABSTRACT

The antinarcissus reflector assembly comprises: a cold stop subassembly that includes an aperture; and a concave spherical mirror having an opening, and also having a center of curvature at the center of the aperture of the cold stop subassembly. Unlike in the prior art devices, the only cold surface that is seen by the optics ahead of the detector is the face portion thereof, which shows through the opening in the concave spherical mirror, rather than reflections of the interior of the cold stop subassembly. Therefore, the undesirable diffused, cool patch which appears in the center of the picture when prior art devices are used is eliminated or, at the very least, is minimized.

1 Claim, 1 Drawing Figure

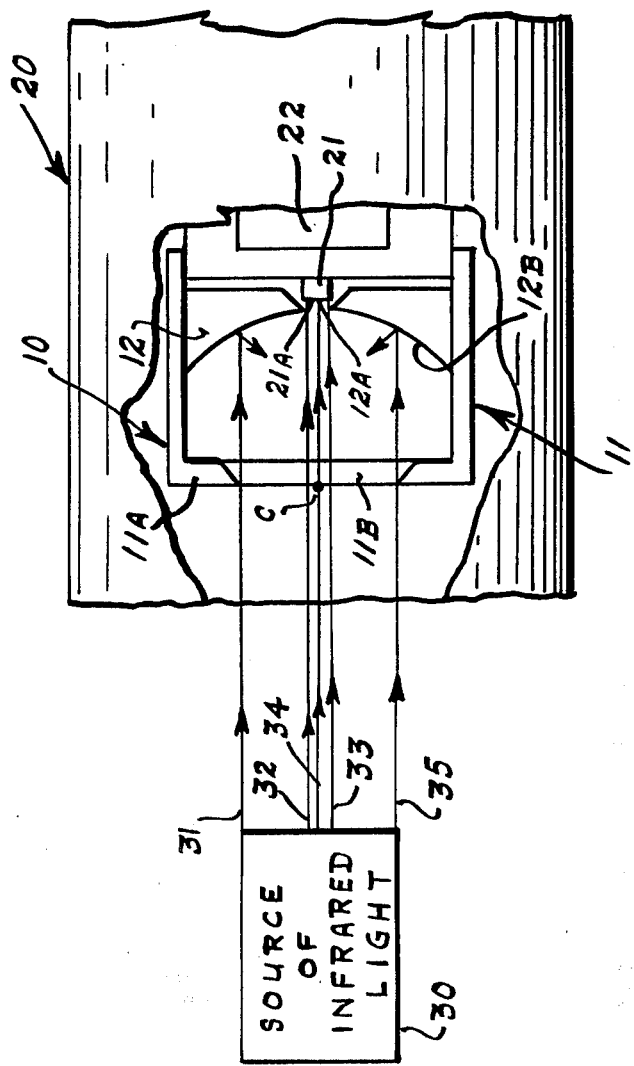

ANTINARCISSUS REFLECTOR ASSEMBLY FOR INFRARED DETECTOR

STATEMENT OF GOVERNMENT INTEREST

The invention described herein may be manufactured and used by or for the Government for governmental purposes without the payment of any royalty thereon.

BACKGROUND OF THE INVENTION

This invention relates to infrared light imaging scanners and, more particularly, to a novel reflector system useable therewith.

Cooled infrared detectors of high sensitivity, which are constituent components of imaging infrared scanners, employ a cold shield to reduce the total infrared radiation, other than the desired signal, reaching the detector(s). This cold shield often has a plate with an aperture through which the signal passes. This aperture constitutes a cold (aperture) stop. The outer surfaces of the cold shield are made reflective. In many infrared imaging systems, reflections of the interior of the cold stop by some elements of the optics ahead of the scan system cause a diffused, cool patch to appear in the center of the picture (i.e., the image). This is called the "Narcissus" effect, because the system is unable to stop looking at itself.

Attempts in the prior art to eliminate this effect have not been entirely successful and, additionally, suffer from inherent disadvantages well known to those of ordinary skill in the art. Such attempts have included: the introduction of an infrared light source into the preexisting optical path, with the source of such size and of such a signal level as to "cancel" the "Narcissus" effect; and, the employment of optical designs intended to diffuse use reflected signals as a trade-off of image sharpness.

My invention eliminates, or at the very least significantly reduces, the affect of the "Narcissus" effect without affecting image sharpness; and, thereby, constitutes a significant advance in the state-of-the-art.

SUMMARY OF THE INVENTION

This invention pertains to an antinarcissus reflector assembly adapted in a preferred embodiment for use with an infrared light detector which is a constituent component of an imaging infrared light scanner.

Therefore, the principal object of this invention is to teach the structure of the above-described antinarcissus reflector assembly.

This principal object, and other equally important and related objects, of this invention will become readily apparent after a consideration of the description of the inventive structure, coupled with reference to the drawing.

DESCRIPTION OF THE DRAWING

The drawing is a side elevation view, in simplified form, partially schematic, partially pictorial, partially in cross section, and partially fragmented of a preferred embodiment of my invention.

DESCRIPTION OF THE PREFERRED EMBODIMENT

With reference to the drawing, shown therein is a preferred embodiment of my invention, generally designated 10, which is for use with an infrared light detector (i.e., sensor), such as 21 with forward face 21A, that is a constituent component of an imaging infrared light scanner, such as 20. Of course, the preferred embodiment 10, the infrared light detector 21, and the image scanner 20 are for use with a source of infrared light, such as 30, which is legended to that effect.

Again with reference to the drawing, also shown therein are: a cryogenic cooling system 22 that is used to cool infrared detector 21, which said cooling system 22 is a component of the image scanner 20; and, representative infrared light rays, such as 31–35, inclusive (together with directional designation arrows thereon), which are emitted by infrared light source 30.

Still with reference to the drawing, the preferred embodiment 10 includes: a cold stop subassembly 11, and a concave spherical mirror 12. In turn, the cold stop subassembly 11 comprises: a plate 11A, made of suitable material; and, an aperture 11B, in and through plate 11A. It is here to be noted that the plate 11A is interposed between the source of infrared light 30 and the infrared light detector 21. The concave spherical mirror 12 has a center of curvature C at the geometric center of the aperture 11B, and also has an opening 12A therein and therethrough. It is here also to be noted that the concave spherical mirror 12 is interposed between the cold stop subassembly 11 and the infrared light detector 21, with the concave surface 12B facing toward the cold stop aperture 11B (and, of course, toward the source of infrared light 30). Additionally, the opening 12A in the mirror 12 is aligned with the cold stop aperture 11B and exposes face 21A of the infrared detector 21.

MANNER OF OPERATION OF THE PREFERRED EMBODIMENT

The manner of operation of the preferred embodiment 10 of my invention can very easily be ascertained by a person of ordinary skill in the art, from the foregoing description, coupled with reference to the drawing.

For others, it is sufficient to say in explanation that the only cold-looking area of the infrared detector 21 which can be "seen" by face portion 21A is "seen" appearing through mirror opening 12A. All other surfaces appear reflective as seen from the outside, and therefore do not appear to be cold. As a result these other surfaces do not cause the prior art diffused, cold patch to appear in the picture.

CONCLUSION

It is abundantly clear from all of the foregoing, and from the drawing, that the stated and desired principal object of my invention has been attained.

It is to be noted that, although there have been described the fundamental and unique features of my invention as applied to a particular preferred embodiment, various other embodiments, adaptations, substitutions, additions, omissions, and the like will occur to, and can be made by, those of ordinary skill in the art, without departing from the spirit of my invention.

What is claimed is:

1. An antinarcissus reflector assembly for use with a source of infrared light and with an infrared light detector which is a constituent component of an imaging infrared light scanner, comprising:
   a. cold stop subassembly comprising a plate of suitable material, with said plate having an aperture therein, and with said plate interposed between said source of infrared light and said infrared light detector;

b. and, a concave spherical mirror having an opening therein, and also having a center of curvature at the geometric center of said aperture of said cold stop plate, with said concave spherical mirror interposed between said cold stop subassembly and said infrared light detector, and with said concave surface of said spherical mirror facing toward said cold stop aperture, and also with said mirror opening in alignment with said cold stop aperture and exposing said infrared light detector.

* * * * *